(12) United States Patent
Roth et al.

(10) Patent No.: US 6,972,144 B2
(45) Date of Patent: Dec. 6, 2005

(54) COMPOSITE STRUCTURAL MATERIAL AND METHOD OF MAKING SAME

(75) Inventors: Arthur J. Roth, Orinda, CA (US); Patrick H. Winters, Moraga, CA (US); Michael H. Clement, Antioch, CA (US)

(73) Assignee: Hunter Paine Enterprises, LLC, Lafayette, CA (US)

(*) Notice: Subject to any disclaimer, the term of this patent is extended or adjusted under 35 U.S.C. 154(b) by 237 days.

(21) Appl. No.: 10/125,573

(22) Filed: Apr. 19, 2002

(65) Prior Publication Data

US 2003/0198775 A1 Oct. 23, 2003

(51) Int. Cl.[7] ............................................. B32B 27/12
(52) U.S. Cl. ..................... 428/68; 428/71; 428/114; 428/298.1; 428/301.4; 428/317.9; 428/318.4
(58) Field of Search ..................... 428/68, 71, 114, 428/298.1, 301.4, 317.9, 318.4

(56) References Cited

U.S. PATENT DOCUMENTS

| | | | | |
|---|---|---|---|---|
| 3,756,901 A | * | 9/1973 | Veneziale, Jr. | 428/220 |
| 3,894,686 A | | 7/1975 | Weinberg et al. | 238/8 |
| 3,930,100 A | | 12/1975 | McDonald | 428/323 |
| 3,978,263 A | | 8/1976 | Wellensiek | 428/306 |
| 4,003,408 A | | 1/1977 | Turner | 138/118 |
| 4,028,288 A | | 6/1977 | Turner | 260/2.3 |
| 4,110,420 A | | 8/1978 | Turner | 264/41 |
| 4,112,176 A | | 9/1978 | Bailey | 428/304 |
| 4,183,505 A | | 1/1980 | Maestri | 256/13.1 |
| 4,709,781 A | | 12/1987 | Scherzer | 181/290 |
| 4,743,323 A | | 5/1988 | Hettinga | 156/160 |
| 4,833,205 A | | 5/1989 | Bauman et al. | 525/123 |
| 4,848,058 A | | 7/1989 | Mullen | 52/585 |
| 4,851,500 A | | 7/1989 | Lalwani et al. | 528/487 |
| 5,010,122 A | | 4/1991 | Koski | 524/80 |

(Continued)

FOREIGN PATENT DOCUMENTS

| | | | | |
|---|---|---|---|---|
| DE | 41 21 081 A1 | | 1/1993 | |
| JP | 53-121894 | | 10/1978 | |
| JP | 2-113932 | | 4/1990 | |
| JP | 02113932 | * | 4/1990 | ............ B32B/5/18 |
| JP | 4-284242 | | 10/1992 | |
| JP | 5-138797 | | 6/1993 | |
| WO | WO 200050233 | * | 8/2000 | ............ B32B/5/28 |

*Primary Examiner*—Elizabeth M. Cole
(74) *Attorney, Agent, or Firm*—Fitzpatrick, Cella, Harper & Scinto

(57) ABSTRACT

A composite structural material suitable, for example, as a replacement for wooden boards, is disclosed. It comprises a dimensionally stable core material ensheathed in a dimensionally stable, laminar covering that is adherent to the core material. The laminar covering is comprised of at least one layer of parallel cords bonded to at least one layer of a rigidified web material selected from the group consisting of paper and cloth. Suitable core materials include polyurethane foam, optionally filled with granulated rubber and/or expandable polymer beads. The parallel cords preferably are supplied in the form of a strip of polyester cloth, as the warp cords thereof. The web material preferably is kraft paper that is rigidified with an epoxy resin.

98 Claims, 6 Drawing Sheets

U.S. PATENT DOCUMENTS

| | | | |
|---|---|---|---|
| 5,193,692 A | 3/1993 | Farley et al. | 211/41 |
| 5,238,633 A | 8/1993 | Jameson | 264/211.23 |
| 5,238,734 A | 8/1993 | Murray | 428/292 |
| 5,254,405 A | 10/1993 | Panaroni et al. | 428/327 |
| 5,258,222 A | 11/1993 | Crivelli | 428/323 |
| 5,259,695 A | 11/1993 | Mostkoff | 405/29 |
| 5,312,573 A | 5/1994 | Rosenbaum et al. | 264/37 |
| 5,316,708 A | 5/1994 | Drews | 264/40.5 |
| 5,362,545 A | 11/1994 | Tingley | |
| 5,413,662 A | 5/1995 | Skinner, III | 156/263 |
| 5,435,954 A | 7/1995 | Wold | |
| 5,439,735 A | 8/1995 | Jamison | 428/255 |
| 5,468,539 A | 11/1995 | Crivelli | 428/141 |
| 5,479,751 A | 1/1996 | White | 52/309.12 |
| 5,523,328 A | 6/1996 | Rosenbaum et al. | 521/41 |
| 5,525,399 A | 6/1996 | Kiser | 428/141 |
| 5,527,409 A | 6/1996 | Lanphier | 156/71 |
| 5,641,553 A * | 6/1997 | Tingley | 428/114 |
| 5,653,923 A | 8/1997 | Spoo et al. | 264/46.1 |
| 5,660,209 A | 8/1997 | Franz et al. | 138/103 |
| 5,662,761 A | 9/1997 | Middelman et al. | |
| 5,693,413 A | 12/1997 | Hesterman et al. | 428/325 |
| 5,704,178 A | 1/1998 | Ciao | 52/309.1 |
| 5,714,219 A | 2/1998 | Mashunkashey et al. | 428/36.1 |
| 5,723,192 A | 3/1998 | Jonasz | 428/64.1 |
| 5,728,338 A | 3/1998 | Kiser | 264/129 |
| 5,733,943 A | 3/1998 | Doan | 521/141 |
| 5,783,125 A | 7/1998 | Bastone et al. | 264/45.3 |
| 5,789,477 A | 8/1998 | Nosker et al. | 524/494 |
| 5,800,754 A | 9/1998 | Woods | 264/115 |
| 5,833,796 A | 11/1998 | Matich | 156/285 |
| 5,852,077 A | 12/1998 | Zawada et al. | 524/8 |
| 5,908,265 A | 6/1999 | Mostkoff | 405/29 |
| 5,914,172 A | 6/1999 | Kiser | 428/143 |
| 5,948,827 A | 9/1999 | Lupo et al. | 521/40 |
| 6,031,009 A | 2/2000 | Gonzalez | 521/41 |
| 6,080,342 A | 6/2000 | Monchiero | 264/15 |
| 6,139,945 A * | 10/2000 | Krejchi et al. | 428/317.9 |
| 6,207,729 B1 | 3/2001 | Medoff et al. | 523/129 |
| 6,374,753 B1 | 4/2002 | Radke, Jr. | 108/51.11 |
| 6,605,343 B1 * | 8/2003 | Motoi et al. | 428/298.1 |
| 2002/0086597 A1 | 7/2002 | Preisler et al. | 442/43 |
| 2002/0088379 A1 | 7/2002 | Phillips et al. | 108/57.26 |
| 2002/0093117 A1 | 7/2002 | Winget et al. | 264/171.13 |

* cited by examiner

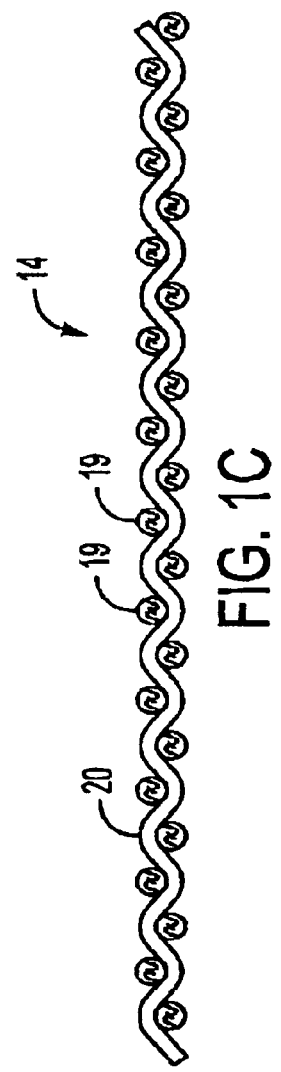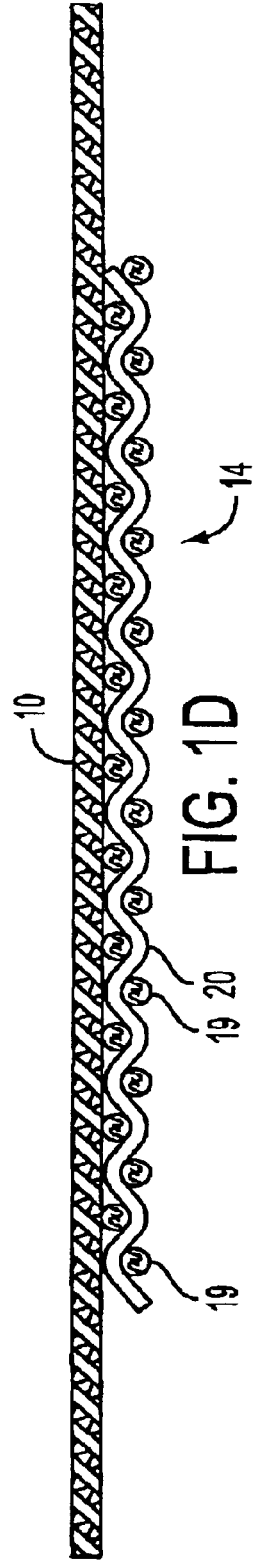

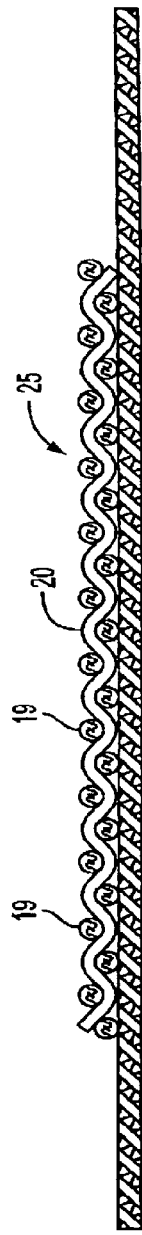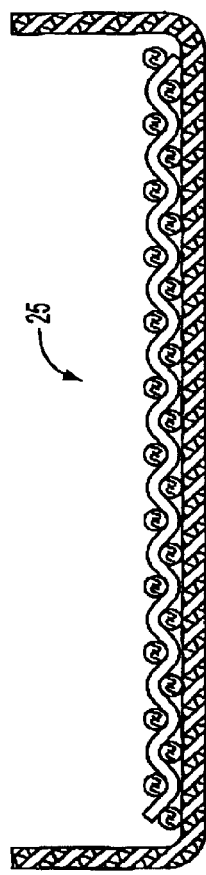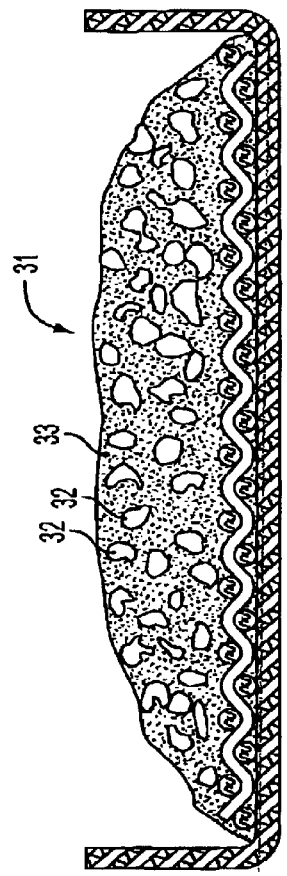

COMPOSITE STRUCTURAL MATERIAL AND METHOD OF MAKING SAME

BACKGROUND OF THE INVENTION

There are many different structural materials made at least in part from synthetic resins, that are intended to be used in place of wood. An elusive goal in designing such materials is the combination of reasonable cost with relatively high strength and stiffness. Thus, for example, synthetic lumber made by hot melt extrusion of mixtures of waste wood fiber and recycled thermoplastic material such as polyethelene can be produced at a low enough cost to make them feasible for use as decking boards. Such synthetic lumber is generally considered unsuitable, however, for uses that require it to withstand higher bending and compression loads, require increased static strength and stiffness requirements, and/or require greater shock and impact resistance. Thus, it is generally unsuitable for use as primary structural load-bearing elements, such as posts, joists, beams, and stringers for shipping pallets. For those types of uses a material has to have a higher flexural modulus of rupture, izod impact resistance, ultimate compressive strength, Young's modulus, and/or accelerating weight resistance than are found in the hot melt extrudates of polymer and wood particles.

As a result of extensive experimentation, the present inventors have discovered a type of design for a composite structural material that can be manufactured economically, yet have a relatively high flexural modulus of rupture, izod impact resistance, ultimate compressive strength, Young's modulus, and accelerating weight impact resistance. Also, if desired, relatively light weight materials can be used, so that the composite can have a specific gravity approaching that of some species of wood that are used for lumber.

SUMMARY OF THE INVENTION

The composite structural material of the present invention comprises a dimensionally stable core material ensheathed in a dimensionally stable, laminar covering that is adherent to the core material. The laminar covering is comprised of at least one layer of parallel cords bonded to at least one layer of a rigidified web material selected from the group consisting of paper and cloth.

The core material can be any dimensionally stable solid. Rigid as well as semi-rigid solids can be used. (By "rigid" is meant herein at least substantially rigid.) As examples of rigid solids, wood itself can be used as the core material, as can gypsum and Portland cement compositions, e.g., cement that is mixed (diluted) with cellulose fiber. In the semi-rigid category are elastomers, e.g., natural or synthetic rubber.

Whether rigid or semi-rigid, the core material is preferably comprised of a resin. For some applications the core material preferably is comprised of pieces of a filler solid embedded in a resinous matrix. (The term "resinous matrix," as used herein, is intended to embrace both filled and unfilled resins.) Because the laminar covering is dimensionally stable, it functions rather like an exoskeleton in the composite structural material of the present invention.

DETAILED DESCRIPTION OF THE INVENTION

The Resinous Matrix

When the core material comprises a resinous matrix, preferably it is a thermosetting resin. Examples of suitable thermosetting resins include epoxy resins, urea-formaldehyde resins, melamine-formaldehyde resins, phenol-formaldehyde resins, polyester resins, and polyurethane resins (both polyether-polyurethanes and polyester-polyurethanes).

When it is important that the structural material have as low a specific gravity as is reasonably possible, it is preferred that the resinous matrix be a foamed synthetic resin, most preferably a rigid or semi-rigid polyurethane or phenolic foam. Polyurethane resins are made by reacting polyols with polyisocyanates. The reaction is exothermic. Cross-linking, or branching, of the polyurethane molecules can be achieved by including in the reaction mixture some polyol molecules and/or isocyanate molecules that have at least three functional groups, and by adjusting the ratio of reactants accordingly. With sufficient cross-linking, rigid or semi-rigid thermoset polymers are obtained. The degree of rigidity can be controlled, for example, by the choice of polyol that is used, which is well-known in the art.

To make rigid or semi-rigid polyurethane foam, a mixture is made of a polyfunctional isocyanate, a polyol, a blowing agent, a catalyst, and, usually, a cell-size regulator (e.g., a surfactant). A urethane-forming reaction begins once the ingredients are combined, an exotherm forms, and the blowing agent or agents cause closed cells to form in the polymer as the mass expands and solidifies. The exotherm typically reaches a peak temperature of at least about 150° F. The isocyanate and polyol reactants include enough molecules with three or more functional groups that the degree of cross-linking or branching is sufficient to produce at least a semi-rigid foam.

Aromatic polyisocyanates often are used when making rigid or semi-rigid foam. Some examples are toluene diisocyanate (TDI) and polymeric isocyanate (PMDI), which is obtained by the condensation of aniline with formaldehyde.

Polyols that can be used include polyether polyols and polyester polyols. Propylene oxide adducts of polyfunctional hydroxy compounds or amines are one type of polyether polyols that can be used. Mixtures of polyester polyols and polyether polyols sometimes are employed.

Halogenated hydrocarbons, such as hydrochlorofluorocarbons and hydrofluorocarbons, can be used as blowing agents. Lower alkanes such as butanes, pentanes, and cyclopentanes can be used as well. Liquid carbon dioxide can be used. Water can also be used, as it will react with isocyanate to generate carbon dioxide in situ. Sometimes water or carbodiimide catalysts are used to generate carbon dioxide as a co-blowing agent. Often the blowing agent or agents are preblended with the polyol, together with the catalyst and the cell-size regulator, which usually is a surfactant.

All of this is well known to persons of ordinary skill in the art and is described, for example, in Kirk-Othmer Encyclopedia of Chemical Technology, $4^{th}$ Ed. (1997), vol. 24, pp. 695–715, which is incorporated herein by reference.

The term "polyurethane system" can be used to refer to a particular combination of isocyanate, polyol, catalyst, blowing agent, and cell size regulator that is capable of reacting to form a polyurethane foam. A characteristic that helps identify and distinguish polyurethane systems is the density of the foam a particular system will create when the components are mixed in an open vessel (the "free rise density"). It is thought that polyurethane systems capable of yielding a free rise density of about 3 or 4 pcf to about 35 pcf are generally preferred for use in the present invention, most preferably those capable of yielding a free rise density of about 4 to about 20 or 25 pcf.

Examples of some commercial isocyanate/polyol pairings that can be employed in forming polyurethane systems for use in the present invention are the following:

| Isocyanate Component | Polyol Component | Rated Free Rise Density (pcf) |
|---|---|---|
| Rubinate M | Rimline WL 87380 | 8–9 |
| Rubinate M | Rimline WL 87381 | 15–18 |
| Baydur 645 B | Baydur 645 A | 5 |
| Baydur 730 B (U 731 B) | Baydur 649 A | 9 |

In the above table, the Rubinate and Rimline reactants are available from Huntsman Chemicals, and the Baydur reactants are available from Bayer Corporation.

Phenolic foams can be made, for example, from resole resins, e.g., phenol-formaldehyde resins made from a molar excess of formaldehyde. The preparation of such a foam is disclosed, for example, in U.S. Pat. No. 5,653,923 to Spoo et al., which is incorporated herein by reference.

The Filler Solid

The filler solid, when used, preferably comprises pieces of one or more of the following: lignocellulosic material, cellulosic material, vitreous material, cementitious material, carbonaceous material, plastic, and rubber.

Cellulosic and Lignocellulosic Fillers

Suitable lignocellulosic materials include wood, e.g., wood powder, wood flake, and waste wood fiber, as well as fiber from woody plants. Suitable cellulosic materials include, for example, plant material such as bamboo, palm fiber, bagasse, rice straw, rice hulls, wheat straw chaff, hemp, sisal, corncobs, and seed shells, e.g., walnut shells. If lignocellulosic or cellulosic material is used, preferably it is fibrous.

Vitreous Fillers

Suitable vitreous materials include glass, fly ash, and ceramic particles. To lighten the weight and lower the cost, hollow vitreous spheres can be used, e.g., glass or ceramic microspheres having a diameter of about 5 to 225 microns. Specific examples include Z-Light® ceramic microspheres, which are available from 3M Company and which have a bulk density of approximately 0.7 g/cc and a crush strength of about 2,000 to 3,500 psi. These come in different versions. One version that it is believed may be especially suitable is Z-Light W-1020 microspheres, which have diameters primarily in the range of about 10 to 120 microns and a crush strength of approximately 3,500 psi.

Among the various glass microspheres that can be used are Scothlite® Glass Bubbles, also from 3M Company, e.g., Scotchlite 538, which has a bulk density of about 0.38 g/cc, a crush strength of about 4,000 psi, and particle sizes that mostly fall in the range of about 8 to 88 microns.

Glass or ceramic reinforcing fibers also can be used.

Cementitious Fillers

As suitable cementitious material may be mentioned, for example, Portland cement, gypsum, blast furnace cement, silica cement, and alumina cement.

Carbonaceous Fillers

As suitable carbonaceous material may be mentioned, for example, carbon black and graphite, as well as carbon fibers.

Plastic Fillers

As regards plastic materials, both thermoset and thermoplastic resins can be used. As suitable plastics may be mentioned, for example, addition polymers (e.g., polymers of ethylenically unsaturated monomers), polyesters, polyurethanes, aramid resins, acetal resins, phenol-formaldehyde resins, melamine-formaldehyde resins, and urea-formaldehyde resins. Homopolymers and copolymers can be used. Suitable copolymers include interpolymers, graft copolymers, and block copolymers.

As examples of suitable addition polymers may be mentioned polyolefins, polystyrene, and vinyl polymers. Suitable polyolefins include, for example, those prepared from olefin monomers having two to ten carbon atoms, e.g., ethylene, propylene, butylene, and dicyclopentadiene. Poly (vinyl chloride) and acrylonitrile polymers can be used. Particles of waste plastic, e.g., post-consumer waste plastic such as used plastic bags and containers, can be used. Examples include bottles made of high density polyethylene and polyethylene grocery store bags.

As suitable polyesters may be mentioned polymers formed by condensation reaction of one or more polycarboxylic acids with one or more polyhydric compounds, e.g., an alkylene glycol or a polyether alcohol. Polyethylene terephthalate is an example of a suitable polyester resin. Chopped up, used polyester containers are a source of such filler particles.

Suitable plastics also include synthetic fibers—e.g., reclaimed fibers from discarded carpet, e.g., nylon, polyolefin, or polyester carpet fibers.

Suitable polyurethanes include, for example, polyether polyurethanes and polyester polyurethanes.

Among the various plastic fillers that can be used in the core material are expandable polymer beads. By "beads" we here mean particles of any geometry, e.g., spherical, cylindrical, or lumpy. Expandable polymer beads are cellular pellets of expandable polymer that often are used to form lightweight molded objects. Created in a more or less granular form, and with an expanding agent in the cells, typically the beads are pre-foamed, or "pre-expanded," by heating to a temperature above their softening point, which often will be in the range of about 165–185° F., until they foam to give a loose aggregate of the desired bulk density. The pre-foamed particles, which retain their cellular structure, may then be placed in a mold or other cavity and heated with live steam, causing them to sinter and fuse together to form a lightweight, cellular solid whose dimensions correspond to those of the mold cavity. When fully expanded, the beads often will have a diameter that is about 2 to 4 times that of the unexpanded, or "raw," beads.

Depending upon the manner in which the rigid core material is made, the beads can possibly be heated to such a high temperature that they will sinter while enclosed in the resinous matrix of the core material. If so, at least a substantial portion of the beads will then lose their cellular structure, creating gas-filled pockets, of various sizes, in the foam, which are lined with the polymer of which the cellular structure was formed. It appears that isolated spherical beads generate relatively spherical pockets. These hard, polymeric globules can lower the density of the core material without significantly lowering its crush resistance. Indeed, it appears that they may even enhance the crush resistance.

The source for the heat necessary to cause bead sintering can be an exothermic reaction that generates the matrix resin in which the beads are trapped. Thus, for example, the matrix resin can be formed by blending the necessary reactants to generate an exotherm having a peak temperature in the range of about 185–285° F.

Chief among expandable polymer beads are expandable polystyrene (EPS) beads and expandable polyolefin (EPO) beads.

Methods of making expandable polystyrene beads are well known. As disclosed in U.S. Pat. Nos. 3,991,020; 4,287,258; 4,369,227; 5,110,835; 5,115,066; and 5,985,943, for example, all of which are incorporated herein by reference, EPS beads may be made by polymerizing styrene in an aqueous suspension, in the presence of one or more expanding agents that are fed at the beginning, during, or at the end of polymerization. Alternatively, they may be made by adding an expanding agent to an aqueous suspension of finely subdivided particles of polystyrene.

The expanding agent, also called a "blowing agent," is a gas or liquid that does not dissolve the styrene polymer and which boils below the softening point of the polymer. Examples of suitable blowing agents include lower alkanes and halogenated lower alkanes, e.g., propane, butane, pentane, cyclopentane, hexane, cyclohexane, dichlorodifluoromethane, and trifluorochloromethane. Often the beads contain about 3 to 15%, based on the weight of the polymer, of the blowing agent. Preferably, the blowing agent will be present at a level of about 3 to 7%.

By "polystyrene" is here meant a styrene homopolymer or copolymer containing 50 wt. % or more, preferably at least 80 wt. %, of styrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole, and maleic acid or anhydride. A minor amount of a copolymerized chain-branching agent may be included in the polymer as well. Suitable such agents are compounds containing at least two α, β-ethylenically unsaturated groups, such as divinyl benzene, butadiene, and butanediol diacrylate. Branching agents are generally used in an amount of about 0.005 to 0.05 mol %, based on the styrene.

The polystyrene in the EPS beads usually has a weight average molecular weight in the range of about 130,000 to about 300,000.

EPS beads come in different unexpanded particle sizes. Generally, a bead's longest dimension (e.g., its diameter), on a weight average basis, will be in the range of about 0.1 to 6 mm, often about 0.4 to 3 mm. It is thought that unexpanded particle sizes in the range of about 0.4 to 1.6 mm are preferred for the beads used in the present invention.

Unexpanded polymer beads vary as to their expansion capability, i.e., how large they can get when heated to expansion temperature. In part, this is a function of how much blowing agent they contain. The expansion capability of a polymer bead can be reported in terms of the bulk density of the loose aggregate the beads will form when they are fully expanded ("fully expanded density"). By "fully expanded" is here meant the expansion that results from the "two pass" expansion process described in Example 2 of U.S. Pat. No. 5,115,066. This entails the use of a Tri Manufacturing Model 502 expander (or equivalent), operated at an inlet steam temperature of about 211° F. and an inlet steam flow rate of approximately 74 pounds per hour. The first-pass throughput rate is about 208 pounds per hour. A fluidized bed drier, blowing ambient air, is used to cool the resulting prepuff. After aging for 3 hours at ambient temperature and humidity, the prepuff is run through the expander again, under the same conditions, except operating at a throughput rate of about 217 pounds per hour.

It is thought that the use of EPS beads having a capability of reaching a fully expanded density in the range of about 0.5 to 4.5 pounds per cubic foot (pcf), e.g., about 1 to 3 pcf, is preferred in the present invention. Examples of some commercial EPS beads that can be used in the present invention are Types 3371, 5371, and 7371 from Huntsman Chemical and Types BFL 322, BFL 422, BF 322, BF 422, and P 240 from BASF Corporation.

As examples of expandable polyolefin beads may be mentioned expandable polyethylene (EPE), expandable polypropylene (EPP), expandable polybutylene (EPB), and copolymers of ethylene, propylene, butylene, 1,3-butadiene, and other olefin monomers, particularly alpha-olefin monomers having from 5 to 18 carbon atoms, and/or cycloalkylene monomers such as cyclohexane, cyclopentene, cyclohexadiene, and norbornene. Propylene/ethylene copolymers and propylene/butylene copolymers may be preferred.

Methods of making expandable polyolefin beads are disclosed, for example, in U.S. Pat. Nos. 6,020,388; 5,496,864; 5,468,781; 5,459,169; 5,071,883; 4,769,393; and 4,675,939, all of which are incorporated herein by reference.

Expandable polymer beads may contain other additives to impart specific properties either to the beads or to the expanded products. These include, for example, flameproofing agents, fireproofing agents, nucleating agents, decomposable organic dyes, lubricants, fillers, and anti-agglomerating additives. As disclosed in U.S. Pat. No. 6,271,272, incorporated herein by reference, the beads may also include additives, e.g., certain petroleum waxes, that quicken the rate of expansion when the beads are heated to expansion temperature. Depending on the intended effect, the additives may be homogeneously dispersed in the beads or present as a surface coating.

If expandable polymer beads are used as filler solids in making the core material for the present invention, they can be mixed with the matrix resin precursor mixture in either the unexpanded, partially expanded, or substantially fully expanded state. Preferably, however, by the time the matrix resin has set, the polymer beads will have undergone at least a partial expansion, as well as a sintering, to yield the polymeric globules entrapped in the matrix. This is described in greater detail in a copending U.S. patent application, entitled "Improved Process of Making Rigid Polyurethane Foam," filed Mar. 22, 2002, by Arthur J. Roth, one of the present inventors. The specification of that application is incorporated herein by reference.

Rubber Fillers

Pieces of natural or synthetic rubber can be used as a filler solid also, e.g., rubber made of styrene-butadiene resin, polybutadiene, or polyisoprene. A preferred source of rubber is used and scrap tires, which can be pneumatic tires or non-pneumatic tires.

Older tires are preferred because they generally have fewer volatives and are less elastomeric. Truck tires are preferred over passenger tires, because they have greater rigidity. Preferably any metal in the tires from metal belts amounts to no more than about 3 weight percent of the rubber, most preferably one percent or less, especially if the composite structure material is to be used to construct shipping pallets. There are a number of reasons. The more metal content, the greater the pallet weight, which increases shipping costs. Also, the presence of pieces of metal can cause additional wear and tear on the equipment used to make the composite structural material, e.g., augers, extruders, and injection heads. Also, if allowed to remain in or among the tire fragments used as filler solids, metal cords, shards, or splinters can project through the laminar covering when the composite is under compression and damage the load on the pallet or present a safety hazard to material-handling personnel.

Ground up used tire rubber is available commercially and comes in different particle sizes. Perhaps preferred for the present invention is No. 4 tire granule, preferably with the tire cord (referred to as "fluff") not removed. Both black and white tire crumb can be used.

Scrap tire rubber is a relatively inexpensive filler, on a volume basis. It is rather heavy, however, and if it is important that the specific gravity of the composite structural material be at or below a certain value, the amount of tire rubber that can be used may be limited accordingly. Thus, for example, if the composite structural material is to be used as synthetic boards to fabricate shipping pallets, specific gravity (i.e., finished pallet weight) is a concern. It is preferred that the core material of such boards have a specific gravity of about 0.65 g/cc or less, e.g., a finished density of about 40 pcf or less. Generally that means using a core material that contains 45 weight percent or less of rubber.

If, on the other hand, the structural material is to be used for an application that is less demanding in terms of specific gravity, e.g., as for range fencing, stationary decking, or highway guard rail posts or blocks, such composites can have specific gravities as high as, say 0.95, or even 1.10, g/cc, e.g., a finished density of up to as high as 60 or 70 pcf. This often permits the use of rubber concentrations of up to 70 or 85 percent, based on the weight of the core material.

The filler particles can be in any shape, e.g., fibrous, flake, or granular (including spherical, e.g., silicate spherules and hollow polymeric spherules, including polymeric microspheres).

As regards the size of the pieces of filler used in the core material, preferably their longest dimension will be no more than about 50% of the thickness of the composite structural material. Thus, for example, if the composite structural material is a board having a thickness of one inch, substantially all of the pieces of filler solid preferably will have a longest dimension that is no more than about 1⁄2 inch.

Preferably the nature of the matrix resin, the nature and amount of the filler particles (if any), and the degree of foaming (if any) of the matrix resin will all be chosen so that the core material has a crush resistance of about 300 pounds per square inch (psi) or more, e.g., in the range of about 300 to 2500 psi. (This refers to the amount of pressure required to reduce the core material's thickness by ten percent.) If the matrix resin is foamed, such crush resistance can be measured, for example, by ASTM D 1621–94, entitled "Compressive Properties of Rigid Cellular Plastics."

The crush resistance of a rigid solid is generally directly related to its density, and so is also related to the ability of the material to hold a nail. (The denser the rigid solid, the more able it generally is to hold a nail.) The present invention is particularly useful for providing wooden-board-substitutes for shipping pallets. For the deck boards of shipping pallets, which do not have to hold nails, and for which the lowest feasible specific gravity is often desired (to lighten the load), a crush resistance as low as about 300 psi (with its concomitant low density) can generally be used, although a crush resistance of at least about 1100 psi is preferred. For stringers in shipping pallets, which generally do have to hold nails, generally the crush resistance should be at least about 1800 psi, and most preferably at least about 2200 psi.

For many applications it will be preferred that the composition and amounts of the matrix resin and filler particles (if any) be such that the structural material has a coefficient of linear thermal expansion that is in the range of about 2.5 to $3.5 \times 10^{-5}/°$ F.

The Web Material

The web material in the laminar covering is rigidified paper or cloth. Because it is less expensive than cloth, paper is preferred. When paper is used, preferably it will have a thickness in the range of about 0.015 to 0.020 inch. Most preferred is a thickness of about 0.017 inch. The paper can be a web of various fibers, e.g., one or more types selected from the group consisting of cellulosic, glass, carbon, metal, and synthetic resin. Examples of suitable synthetic resin fibers include polyamide fibers and polyester fibers. Most preferably the fibers are oriented in the paper, e.g., as in paper in which the fibers are oriented in the machine or warp direction, also sometimes called the "milled direction."

For reasons of economy it is believed to be preferable to use a paper that is made at least primarily of cellulosic fibers, e.g., from wood pulp. A preferred cellulosic paper is kraft linerboard paper, for example having a basis weight (or "grade code") of about 65 to 75 lbs. per msf (thousand square feet). The preferred moisture content is about 7 to 9 wt. %, e.g., approximately 8%. The Mullen value preferably is about 130 or 140 to about 145 psi. CD Ring Crush value is preferably about 120 or 130 to about 140 lbs.

One suitable paper is 100% recycled standard linerboard paper having a basis weight of about 69 lbs. Such is manufactured, for example, by Gaylord Container Corporation. Virgin paper also can be used, of course, but it tends to have lower capillarity than recycled paper, which, for that reason is generally preferred.

The Parallel Cords

Preferably the cording used in the laminar covering has a tensile strength in the range of about 5 to 18 pounds per cord, most preferably about 16 pounds. The cording preferably has a breaking tenacity of about 0.67 to 1.10 gf/TEX, most preferably about 0.85 gf/TEX.

The cording can be made of continuous filament or staple fibers. Monofilament cording can be used, but cording made of a plurality of continuous filaments (so-called "multifilament" cording) is preferred. Preferred multifilament cording is that which is made of about 40 to 70 filaments. If multifilament cording is used, the filaments can be twisted or untwisted. If twisted, it is preferred that the cord have not more than 3.25 twists per inch.

As for breaking elongation, preferably the cording's is in the range of about 10 to 50%, e.g., about 20 or 25% to about 45 or 50%. Most preferred for monofilament cording is a breaking elongation of about 30 to 40%, e.g., about 35%. Most preferred for multifilament cording is a breaking elongation of about 15 to 20%, e.g., about 17%.

The cording can be made in whole or in part of either natural or synthetic fibers or filaments, including fibers/filaments of synthetic resin, glass, carbon, and metal. Synthetic resin fibers/filaments are preferred, e.g., polyester, polyamide (such as nylon and poly-paraphenylene terephthalamide), or polyolefin fibers or filaments.

If the cording is made of shrinkable fibers/filament, preferably it is heat stabilized prior to being used to construct the composite structural material of the present invention.

When made of a monofilament, the cording preferably has a diameter of about 8 to 15 mil (i.e., about 0.008 to 0.015 inch), most preferably about 10 to 12 ml.) When made of multifilament, the cording preferably has a denier of about 600 to 1,000, most preferably about 900.

As for the density of the parallel cords in the band—i.e., the number of cords per inch of width of the band—the preferred level varies in inverse relationship to the diameter or denier of the cording. The thicker the cording, the lower the preferred density. Generally, however, the density will preferably be at least about 10 or 12 cords per inch of band width ("lateral inch"), and usually not more than about 35 cords per lateral inch.

The parallel reinforcing cords can be unconnected one to the other, or they can be laterally connected, e.g., by cross-cording. The latter arrangement has the advantage that it can help keep the longitudinal cords in place during the formation of the laminar covering. An advantageous way of providing the cords in this fashion is to use a strip of cloth in which the longitudinal cords constitute the warp, i.e., the "yarn," "fiber," or "thread" that is in the cloth's "machine direction." By "cloth" is here meant either a woven cloth or a cross-laid scrim. The latter is nonwoven netting formed by laying parallel rows of continuous yarn or thread in the warp direction and then laying parallel rows of cross yarns or threads on top of that layer, at a 90 degree angle thereto, and bonding the two layers together at the cord intersections, e.g., either by thermal bonding or by use of a glue. When cross-laid scrim is used, the warp side can either face outwardly form the composite or inwardly. Preferably, however, it will face outwardly and will be next to a layer of web material.

Generally it is preferred that any cloth that is used have a warp direction tensile strength that is within the range of approximately 90 to 200 pounds per lateral inch (pli), most preferably approximately 155–185 pounds per lateral inch. By this is meant the amount of longitudinal stress necessary to tear apart a one-inch-wide band of the cloth, running in the warp direction.

If the cloth comprises any shrinkable fibers/filament, preferably those will be heat stabilized before the cloth is used to construct the composite of the present invention.

It is preferred that the cross-cording (i.e., the woof or weft of the cloth, also sometimes called the "pic" or the "fill") be of a smaller diameter and/or of a lesser density (fewer cords per inch of cloth) than the warp. Thus, for example, the diameter or denier of the warp cords may be about 1.8 to 2.5 times that of the woof cords, and the density of the warp cords (i.e., the number of cords per lateral inch of the cloth) may be about 1.5 to 3 times the density of the woof cords (i.e., the number of cords per longitudinal inch of the cloth.)

When woven cloth made of 10–12 mil monofilament in the warp direction is used, preferably the warp density will be at least about 20 cords per lateral inch of the cloth, e.g., in the range of about 20 to 35 cords per lateral inch of the cloth. The woof cords of such a cloth preferably will have a diameter in the range of about 4–8 mil, most preferably about 6–8 mil. The woof density for such a cloth may be, for example, about 10 to 18 cords per longitudinal inch of cloth.

Among the woven cloths that can be used very effectively to supply the reinforcing cords are those composed of about 8–12 mil polyester monofilament as the warp and about 6–8 mil polyester monofilament as the woof. Advantageously such polyester cloth has approximately 20–30 cords/inch in the warp and approximately 10–15 cords/inch in the woof. Prototype fabric No. XF368080 from Industrial Fabrics Corporation, of Minneapolis, Minn., is a woven polyester cloth that meets these specifications. Its warp cording has a diameter of approximately 10 mil, a tensile strength of approximately 5.2 pounds per cord, and a breaking elongation of approximately 46%. The density of the warp is approximately 27–29 cords per lateral inch. The woof cording has a diameter of about 8 mil. It is estimated that a one-inch-wide strip of this cloth has a tensile strength in the warp direction of approximately 95–105 pounds and an elongation at break of approximately 46%.

Also suitable is the same woven polyester cloth as just described, but having a warp cord density of only 24 cords per lateral inch. It also can be obtained from Industrial Fabrics Corporation. That fabric has a warp direction tensile strength of approximately 91 pounds per lateral inch and an elongation at break of approximately 46%.

An example of a suitable cross-laid scrim is Connect™ scrim from Conwed Plastics, Inc., of Minneapolis, Minn. One embodiment thereof has a warp composed of untwisted polyester multifilament cord (60 filaments per cord) having a denier of about 1000. The warp has a cord density of 12 cords per lateral inch. The warp cording has a tensile strength of about 17.5 pounds per strand of the cord. A one-inch-wide, warp direction strip of the scrim has a tensile strength of about 185 lbs., a breaking elongation of about 24%, and a breaking tenacity of about 0.92 gf/TEX.

Preferably the laminar covering will comprise a band of parallel cords (which, as indicated, can be a strip of cloth) that covers at least one side of the structural material. For example, at least about 25% of the cross-sectional circumference of the material can be covered with one or more bands of parallel cords. If the material is rectangular in cross section, it is most preferred that at least two opposite sides be covered with bands of the cords. Most preferably, all sides of the structural material will be covered with bands of the cords. If the cross section is an elongated rectangle and the material is to be used as deck boards for shipping pallets, e.g., as a substitute for 1"×4" or 1"×6" lumber, it is preferred that at least the two wide sides of the board be covered with bands of the cords.

For other uses, however, if only two sides are covered with the bands of cords, it might be preferred that they be the narrower sides. Thus, for example, in shipping pallets the stringers often are wooden 2×4s or 3×4s set "on edge." If the structural material of the present invention is to be used in place of such wooden boards, then it is preferred that at least the two narrow sides be covered with bands of the cords.

Most preferred for shipping pallets, however, is that all four sides of both the deck boards and the stringers be reinforced with bands of parallel cords. In this way not only is the pallet able to withstand large loads, it also is more resistant to damage along the vertical surfaces of the boards, e.g., due to being hit by fork lift tines.

As far as dimensions are concerned, the present invention is very useful for the construction of board-shaped materials having a thickness of about ½ inch to 8 inches and a width of about 2 to 48 inches, although it certainly is not limited to such materials.

For maximum strength, it is preferred that at least some of the reinforcing (longitudinal) cords in the laminar covering be bonded to the web material in a pretensioned state. The amount of tension can be expressed in terms of how much the cord is stretched. Thus, every cord has an elongation-at-break value that is expressed as how much, in percent, the cord's length can be increased by stretching, before the cord breaks. The more it is stretched, the greater the tension on the cord. In the present invention it is contemplated that it generally will be preferred that the cord not be stretched (i.e., elongated) beyond about 85% of its capacity. Thus, if its elongation at break is 30%, say, then it is preferred that the cord not be lengthened by tension to more than 125.5% of its starting length.

As for the minimum amount of stretching, it is preferred that the cord be stretched to at least about 10% of its capacity, most preferably at least about 20%, 30%, or 40% of its capacity. Often the most preferred range will be about 50 or 60% to about 80% of its capacity. Generally it will be preferred, when cloth is used as the source of the parallel cords, that it be pretensioned in the warp direction to a value of at least about 10 pli, most preferably at least about 50 pli, e.g., at least about 75 or 100 pli.

The Bonding/Stiffening Resin

The cords preferably are bonded to the web material by a resin, most preferably a resin selected from the group consisting of epoxy, polyurethane, acrylic, nitrile, butyl, allyl, urea-melamine, vinyl ester, phenolic, silicone, and cyanoacrylate resins. A thermosetting resin, e.g., a thermosetting vinyl ester resin or a thermosetting epoxy resin, is most preferred. If the core material comprises a matrix resin, then the bonding resin preferably is compatible with the matrix resin, i.e., will adhere thereto. In this regard, certain polyurethane and epoxy resins are known to be compatible, as are certain phenolic and vinyl ester resins.

To make the laminar covering dimensionally stable, it is preferred that the web material be impregnated with a set resin, most preferably a cured thermosetting resin. Again, compatibility with any bonding resin and matrix resin that is used is desired. Preferably the same binding resin that is used to bond the cords to the web material is also used to impregnate and stiffen the web material.

Epoxy resins are perhaps preferred for the stiffening resin and the bonding resin. Both one-component epoxy resin systems that require elevated temperatures to cure and two-component epoxy resin systems that can cure at room temperature can be used. The two-component systems have separate resin and hardener components.

As for viscosity, the systems can be thin enough to be sprayable or so viscous that they have to be applied with, for example, a bath roller or a "pin" roller. An example of the sprayable type is Product Code R 88-14B/H 88-14E from Copps Industries, Inc., of Mequon, Wis., which is a two-component system having a viscosity (immediately after mixing) of about 1,480 cP, when mixed at a weight ratio of 4.2 parts resin to one part hardener. Its gel time at 77° F. is approximately 24 minutes, as measured by ASTM Test D2471. An example of a system that also can be used but which is too viscous to be sprayed effectively is Copps Industries R 88-14A/H-14D, which is a two-component system having a viscosity of about 3,000 cP, when mixed at a weight ratio of 3.1 parts resin to one part hardener, and a gel time at 77° F. of about 42 minutes.

System R 88-14B/H 88-14E is designed to bind laminated structures and will bind well to cellulosic paper, fiberglass mesh, polyurethane foam, and recycled rubber, among other materials. R 88-14A/H 88-14D also is designed to bond to a wide variety of similar and dissimilar materials. Also suitable is a developmental epoxy resin system from Copps that is designated R 900/H 900.

The laminar covering can be comprised of a single layer of web material and a single layer of cording. Alternatively, a plurality of layers of one or both can be used. Where a plurality of parallel-cords layers are used, preferably a web layer will be interleaved between every two parallel-cords layers. Preferably, the covering will comprise at least one combination of a layer of parallel cords bonded to a web layer that is exterior to the parallel-cords layer. Thus, for example, excellent strength can be obtained by a four-ply arrangement, starting from the core, of cord layer/web layer/cord layer/web layer.

Greater surface smoothness generally can be obtained if the outermost of all the parallel-cords and web layers is a web layer. This can be advantageous in a case in which the structural material has to be kept sanitary. If, for example, the structural material is to be used as a board in a shipping pallet (e.g., as either a stringer or a deck board), it might have to be sterilized when the pallet is used in areas of food preparation or handling. This can entail steam treatment and/or washing with disinfectants containing bactericides, such as chlorine-containing reagents. The composite structural material of the present invention, especially when having a resin-stiffened web material at its outer surface, can be easier to sanitize than boards of real wood, due to its having fewer cracks, crevices, and pores in which microorganisms can reside, and possibly escape the heat or contact with the disinfectant.

Making the Composite Structural Material With a Segmented Covering

The laminar covering can be in one piece or in longitudinal sections. For ease of manufacture, it might be preferred that the laminar covering be comprised of two mating C channels that run the entire length of the structural material. The C channels would be opposed, their openings facing each other. It is preferred that the two channels overlap along their longitudinal edges and that they be conjoined, for example with the same thermosetting resin as is used to rigidify the web material. If the cross-sectional shape of the structural material is a non-square rectangle, then it is preferred that each of the C channels covers one of the wide sides of the structural material—i.e., that the overlapping edges of the two C channels be located on the narrow sides.

The C channel version of the composite structural material of the present invention can be made, for example, by a method comprising the following steps:

a) obtaining a first elongated C channel of a porous web material that is impregnated with a thermosetting resin precursor mixture and orienting the channel with the C facing up;

b) impregnating a strip of cloth with a thermosetting resin precursor mixture that is compatible with the resin precursor mixture in the web material;

c) laying said strip of cloth on the inside bottom of the first C channel, with the warp running in the lengthwise direction of the channel, so as to extend the length of the channel;

d) depositing on the top of said strip of cloth a fluid mixture of a matrix resin precursor composition and pieces of a filler solid, the matrix resin precursor composition being compatible with both the resin precursor mixture in the web material and the resin precursor mixture in the cloth;

e) covering the first C channel with a second C channel of a porous web material that is impregnated with a thermosetting resin precursor mixture that is oriented with the C facing down, so that the vertical sides of the two channels overlap and touch each other and the two C channels define a core space between them; and f) holding the two C channels together under conditions that are conducive to the setting of (i) the matrix resin in the core space, (ii) the thermosetting resin in the porous web material, and (iii) the thermosetting resin in the cloth, and for a length of time sufficient for all three resins to set, whereby the two C channels become bonded together where they overlap, the cloth strip becomes bonded to the first C channel, the core space becomes filled with the mixture of matrix resin and pieces of filler solid, and the matrix resin becomes bonded to the cloth and the web material.

The foregoing steps do not have to be performed in the order listed. For example, the strip of cloth can be laid on the porous web material either before or after the latter is forced into a C-channel shape. Also, the impregnation of the web material and the cloth with thermosetting resin can occur before or after the layering of the cloth on the web material.

To keep the density and cost of the structural material relatively low, it is preferred to use a matrix resin that is foamable, and to deposit the mixture of matrix resin precursor composition and filler solid (if used) on the cloth in a volume amount that is insufficient, without foaming, to fill the cavity between the two C channels of web material. In such a method, the two C channels are held together under conditions that are conducive to the forming, foaming, and setting of the matrix resin, whereby the mixture of resin and filler solid (if used) expands to fill the cavity between the two C channels. The foaming can be caused by the release, expansion, or generation of one or more gases in the resin precursor mixture, e.g., a gas selected from the group consisting of carbon dioxide, nitrogen, hydrofluorocarbons (e.g., HFC 245SA and HFC 134A), chlorofluorocarbons, and lower alkanes, e.g., pentanes. Resin systems for generating foamed thermoset resins are well known in the art, and include, for example, the aforementioned polyurethane resin systems.

For maximum composite strength, when using the C channel method of fabrication, the second (top) C channel that is used in step e is underlaid with a second strip of cloth that also is impregnated with a thermosetting resin precursor mixture that is compatible with the resin precursor mixture in the web material. That cloth also should extend the length of the second C channel, and it too should become bonded to both the second C channel and the matrix resin, during step f.

The C channel method of fabrication can be run on a substantially continuous basis by pulling each of the porous web material strips and the woven cloth strip or strips off its own supply roll. For each C channel, the porous web material can be pulled through a wetting station where it is impregnated with the thermosetting resin precursor mixture. Depending on the viscosity of the thermosetting resin precursor mixture, wetting might be accomplished by spraying, gravure printing a pattern of the mixture on the web material, or passing the web material through a bath of the mixture. Either before or after the wetting station, each run of the web material can also be pulled through a forming station where it is folded into the desired C channel cross section.

Meanwhile, each strip of cloth can be pulled through a wetting station where it is impregnated with its thermosetting precursor mixture. One of the impregnated strips of cloth is then made to lie on the inside bottom of the first (upward facing) C channel, following which the fluid mixture of the matrix resin precursor composition and pieces of filler solid is deposited on top of the cloth. The second impregnated strip of cloth is made to lie against the underside of the second (downward facing) C channel, which is poised above the first C channel.

After the station at which the fluid mixture is deposited onto the upward facing first C channel, that channel can be covered with the cloth-lined downward facing second C channel. If the dimensions of the two C channels are the same, the top one can be slightly offset, in the lateral direction, so that one of its side walls (i.e., its vertical walls) rides outside one of the side walls of the bottom C channel, while the other side wall of the top C channel rides inside the other side wall of the bottom C channel. Alternatively, one of the C channels can be made slightly wider than the other, so that it completely straddles (i.e., overarches) the other C channel.

Once they are mated in this manner, the two runs of resin-impregnated cloth and two runs of resin-impregnated web material can be simultaneously pulled through a continuous molder that is maintained at the proper temperature to cause the matrix resin, the thermosetting resin in the porous web material, and the thermosetting resin in the cloth all to form and set. It might be preferred, however, before entering the continuous molder, that the resin-precursor-mixture-impregnated web material and cloth be heated. This can flash off some solvent in the mixture(s) and/or accelerate the reactions that have to occur and, as a consequence, shorten the time that the mated C channels have to remain in the continuous molder.

The continuous molder can be, for example, at least one tractor mold, which sometimes is called an "endless flexible belt mold." This is a type of mold in which cooperating half-mold segments revolve on opposed ovoid conveyor tracks to grip between them a section of an axially moving, continuous linear feed material and hold it for a time, while the material and the abutting half-mold segments continue to travel forward. The half-mold segments are connected, back and front, to identical segments, much like links in a tractor tread. Each pair cooperates to form an external die that holds its section of the feed material in the desired shape as the material solidifies. The half-mold segments can be equipped with temperature-control means to cause the synthetic resin in the feed material to become set by the time the segments reach the end of their forward run. There the opposed segments separate, releasing the section of the feed material, and each segment circles back to the beginning to grip another section of the feed material. Meanwhile, the intervening length of feed material has been gripped and treated by other pairs of half-mold segments. One example of a moving mold of this type is disclosed in U.S. Pat. No. 5,700,495 to Kemerer, et al., which is incorporated herein by reference. The forward run of the tractor mold preferably is long enough that, by the time the two C channels emerge from the mold, the impregnating resins and the matrix resin have all been formed and are set. If necessary, however, the feed material can be passed through a series of two or more tractor molds in order to hold the material in the desired shape until the resins in it are all set.

The mixture of matrix resin precursor composition and filler solid can be preformed and pumped as one uniform mixture through an applicator conduit, so as to land on the cloth in the bottom C channel. Alternatively, the components of the mixture can be kept separate in two or more segregated streams, and those streams can be blended in a mixing nozzle, or even in the air space between the exit openings of their respective applicator conduits and the surface of the cloth upon which the components land. In this way, it can be arranged that none of the material streams is independently settable; instead it requires that two or more streams be blended before a settable mixture is obtained. Thus, the method can be performed much like reaction injection molding (called RIM molding) in which a necessary curing catalyst and/or cross-linking agent is delivered to the fill hole of a mold cavity in one stream, while a monomer or prepolymer that needs to be mixed with the catalyst and/or cross-linking agent in order to provide a settable mixture is delivered in a separate stream. To blend the streams in the air space beyond each applicator conduit's exit opening, they can be pumped through nozzles that are aimed to cause the streams to collide in the air. Alternatively, the streams can be blended in a mixing head.

One advantage in not forming a settable mixture until all of the necessary ingredients enter or exit the applicator nozzle is that if the process has to be shut down early, there will be no volume of premixed resin in a supply vessel that will have to be discarded due to its having too short a pot life.

Once the process is past its start-up phase, the strips of cloth and web material can all be simultaneously and uniformly pulled through the continuous molder by grasping the emerging rigid composite and propelling it away from the molder, in the axial direction, e.g., by use of a tractor mechanism. The composite can then be cut into desired lengths at a cutting station, e.g., by use of a flying cutter.

Once the process is past its start-up phase and the emerging composite is being pulled away from the continuous molder and thrust forward to the cutting station, tension can be placed on the cloth strips entering the continuous molder, so that the cords that make up the warp of the cloth (the lengthwise cords) are pretensioned when they are bonded to the matrix resin and the web material.

When using a foamable matrix resin, the specific gravity of the structural material that exits the continuous molder is controlled to some extent by the rate of deposit of the mixture of matrix resin precursor composition and filler solid on the moving web material. The greater the amount of mixture that is deposited per each foot of the moving web material, the more compressed will be the finished core material and, therefore, the greater will be its specific gravity.

If a thermoplastic matrix resin is used, the mixture of resin and filler solid has to be heated to a resin melting temperature either prior to deposition on the web material or after such deposition. Also, the last segment of the continuous molder may be equipped with cooling means, so as to cause the matrix resin to resolidify prior to the emergence of the composite material from the exit end of the die.

Even if a thermosetting matrix resin is used, there may be some advantage in cooling the last segment of the continuous molder so as to lower the temperature of the composite material before it exits the molder—namely, by cooling it in the continuous molder the composite will undergo less deformation and its temperature will more quickly drop into a range in which the composite can safely be handled. Using tractor molds this requires a series of at least two such molds, so that the last tractor mold can be operated at a lower temperature than the mold in which the thermosetting occurs.

If heat needs to be applied to the mixture of matrix resin and filler solid while it is being carried through the continuous molder, any suitable source thereof can be used, including, for example, radio frequency, microwave, and induction heating.

Making the Composite Structural Material With a One-Piece Covering

Alternatively, the composite structural material of the present invention can be made by use of nonwoven strands of reinforcing cord, and in such a way that the laminar covering is in one piece, rather than in two longitudinal sections. Thus, for example, a single strip of web material that is wide enough to completely ensheath the core material, preferably with some overlapping, can be used. Parallel strands of reinforcing cords, each from its own supply spool, can be laid on a side of the web material, the fluid mixture of matrix resin precursor composition and pieces of filler solid can be deposited on the cord-carrying side of the web material, and the web material can be forced into a sleeve-like configuration having the desired cross-sectional shape of the structural material, with the cord-carrying side facing the interior of the configuration. Then the mixture-carrying web material, while in the sleeve-like configuration, can be passed through the continuous molder as described above. In this embodiment the cords also can be pretensioned, once finished composite material is being pulled away from the molder. The porous web material can be sufficiently impregnated with stiffening resin precursor mixture that the reinforcing cords will not need to be independently wetted with bonding resin. Independent wetting of the cords still remains an option, however.

Preferably the web material is forced into its sleeve-like configuration prior to the mixture of matrix resin precursor composition and filler solid particles being deposited on the web material. The forcing of the web material into a sleeve-like configuration can be facilitated by wrapping the material around, and pulling it over, an elongated mandrel that corresponds in shape to the external die segments of the continuous molder. In this manner the mandrel imparts its shape to the web material and the external die helps to hold that shape.

Since it is preferred to force the web material into its sleeve-like configuration prior to depositing the resin/filler solid mixture on the web material, it is advantageous to use a mandrel that has an interior passage ending in an exit opening that is poised about the moving strip of web material. In that way, the mixture of resin and filler solid can be pumped through the mandrel's interior passage and out the exit opening, so as to be deposited on the web material. In this arrangement (as in the C channel embodiment) the web material acts like a tubular conveyor belt as it carries the mixture of matrix resin and filler solid through the continuous molder.

This process can also be performed using one or more strips of cloth, instead of individual strands of cord.

ILLUSTRATED PROCESS EXAMPLE

The invention perhaps will be better understood by considering the following description of one way of manufacturing the new composite structural material.

Figures 1, 1A:
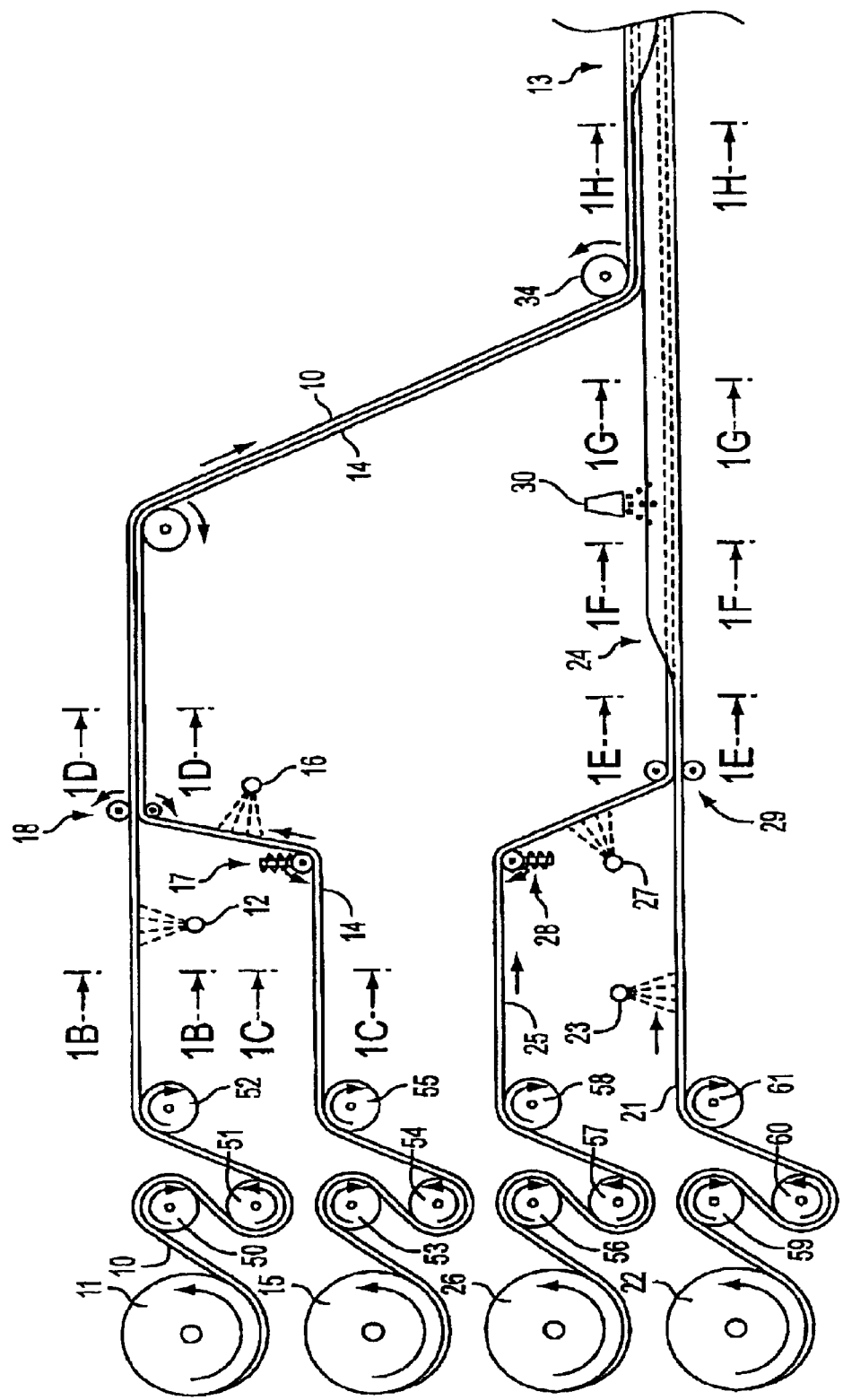
FIG. 1 is a schematic representation of one method of making the composite structural material of the present invention.

This example describes the construction of a composite board having the cross-sectional dimensions of a 1×4, i.e., ¾ inch by 3½ inches, using the C-chann method. The process is continuous and is illustrated schematically in FIG. 1. The proportions in FIG. 1 are not to actual scale. For example, for ease of illustration the thickness of papers 10 and 21 is exaggerated. So is the diameter of the warp cords 19 and the woof cords 20. And whereas the drawings depict approximately two dozen warp cords across the width of a 1×4, in actual practice there would preferably be at least 70. Also, FIGS. 1B through 1J are on a larger scale than FIG. 1A, for ease of illustrating certain details.

Referring to FIG. 1, a strip of recycled kraft paper 10 is pulled off supply roll 11, passed around guide roller 50, tension roller 51, and guide roller 52, and then passed over spray bar 12 where it is sprayed with a freshly prepared mixture of epoxy resin and hardener components. The combination of guide rollers 50 and 52 and tension roller 51 helps provide a uniform delivery of paper 10, i.e., without jerking. The cellulosic fibers (not shown) in paper 10 are oriented in the lengthwise direction of the strip. Meanwhile, woven polyester cloth 14 is pulled off supply roll 15, passed around guide roller 53, tension roller 54, guide roller 55, and a second tension roller 17, and then passed over spray bar 16 where it is sprayed with the same epoxy resin mixture. The resin-impregnated cloth 14 is pulled to laminating station 18, where it is pressed against the wet underside of paper 10, to yield the configuration shown in FIG. 1D. As shown in FIGS. 1C and 1D, the warp of cloth 14 consists of cords 19. Cords 19 are held in place by woof cording 20, which is smaller in diameter.

A second strip of recycled kraft paper 21, identical to paper 10, is pulled from supply roll 22, passed around guide roller 56, tension roller 57, and guide roller 58, and then is impregnated with the same epoxy resin composition, which is sprayed onto the upperside of paper 21 from spray bar 23. Meanwhile, polyester cloth 25 is pulled off its supply roll 26, passed around guide roller 59, tension roller 60, guide roller 61, and second tension roller 28, and then is sprayed on its underside with the same epoxy resin composition from spray bar 27. Cloth 25 is identical to cloth 14. Resin-impregnated cloth 25 is pulled into laminating station 29 where it is pressed against the inside bottom of paper 21, yielding the assembly illustrated in FIG. 1E. At folding station 24 (equipment not shown) the edges of paper 21 are bent upward, creating an upward-facing C channel, as shown in FIG. 1F. The combination of paper C channel 21 and polyester cloth strip 25 is pulled past ejection nozzle 30 where a mixture of matrix resin precursor components and filler solids is deposited on cloth strip 25. As shown in FIG. 1G, the mixture deposit 31 consists of filler solids 32 suspended in a fluid mixture 33 of the components that will react to form a rigid, thermoset, polymeric foam. The combination of C channel, cloth, and core material precursor mixture 31, as shown in FIG. 1G, is then pulled toward continuous molder 37. Before that combination enters molder 37, however, the laminated strips of paper 10 and cloth 14 are guided by roller 34 into position above bottom C channel 21, as shown in FIG. 1H. Then top paper 10 is bent at folding station 13 (equipment not shown) into a downward-facing C channel that overlaps upward facing C channel 21, as shown in FIG. 1I. That assembly is then pulled through continuous molder 37, which is maintained at an optimum temperature for assisting the forming, foaming, and setting of the resin precursor fluid 33, to yield cellular matrix resin 38, as shown in FIG. 1J, which is a cross-sectional representation of the finished board. The interior (not shown) of continuous molder 37 is, in effect, an external die that holds the assembly of paper, cloth, and core material mixture in the desired cross-sectional shape. Pressure that presses the paper and cloth against the interior wall of continuous molder 37 is generated by the hot gas that is causing the resin to foam.

The finished board 40 is continuously pulled out of continuous molder 37 by tractor device 41. Once board 40 begins to emerge from molder 37, tension is placed upon cloth 14 by adjustment of tension roller 17, and tension is placed upon cloth 25 by adjustment of tension roller 28. Continuous molder 37 is long enough that, before board 40 emerges from the molder, cords 19 in both the top cloth 14 and the bottom cloth 25 are strongly enough bonded to rigidified paper strips 10 and 21, as well as to the foamed matrix resin 38, that, once the board is cut into sections, the tension in cords 19 will not be sufficient to break those bonds. Top C channel 10 is bonded to lower C channel 21 by the set epoxy resin at their interfaces 42 and 43 where their side walls overlap.

Illustrated Shipping Pallet

Figures 1, 1A, 2:
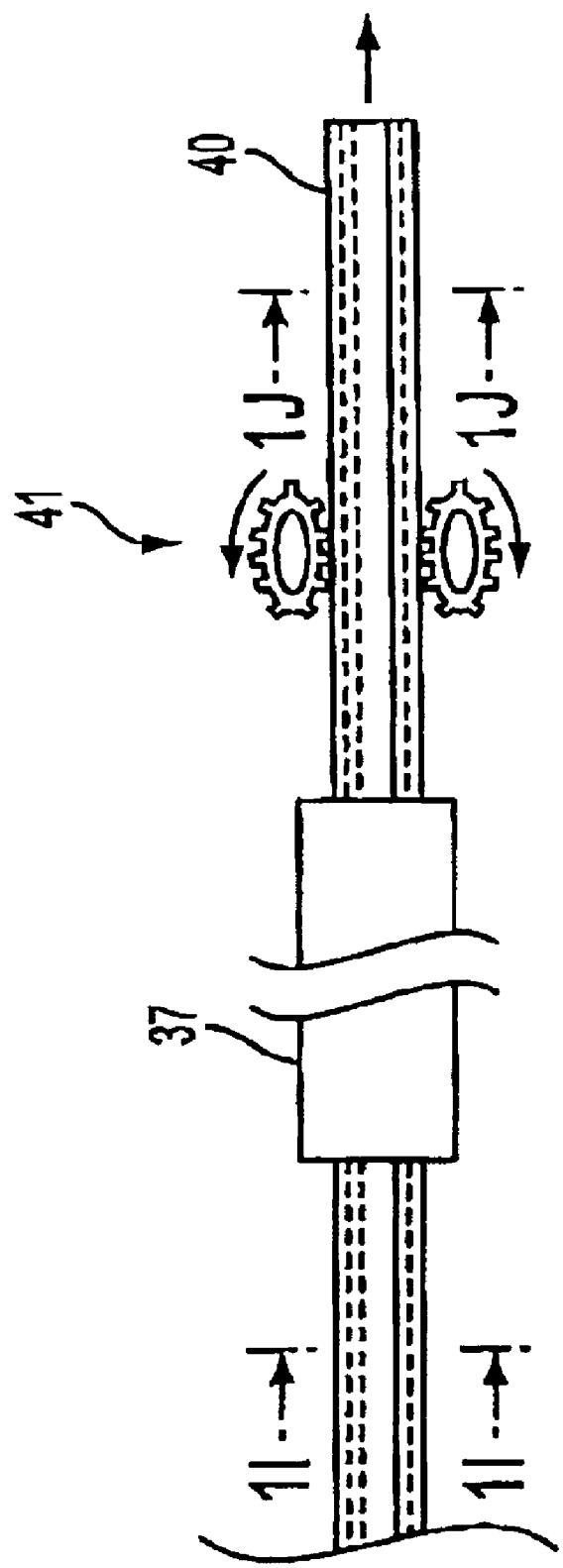
FIG. 2 is an elevation view of a shipping pallet constructed of boards of the present invention.
Figure 1H:
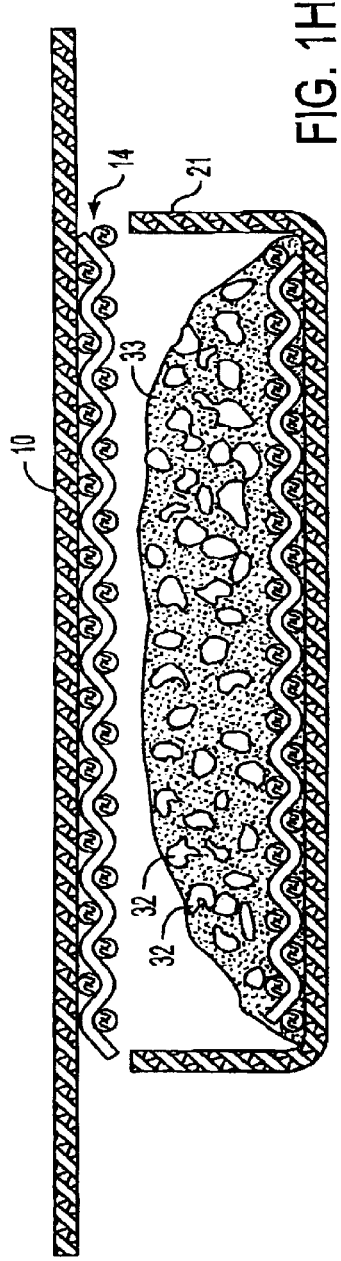
Figure 1I:
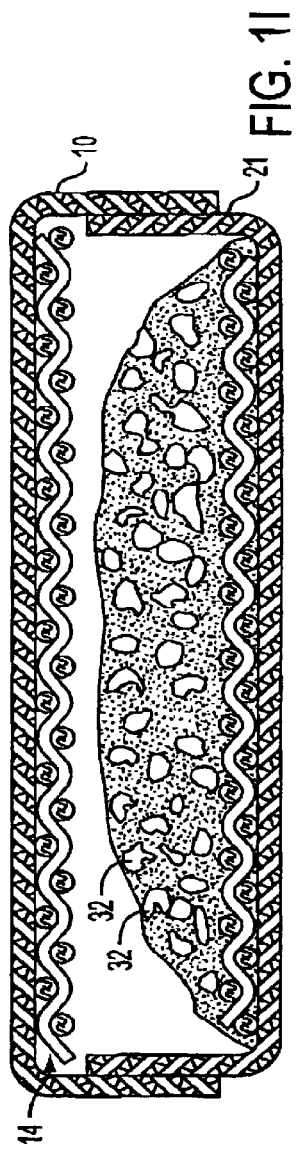
Figure 1J:
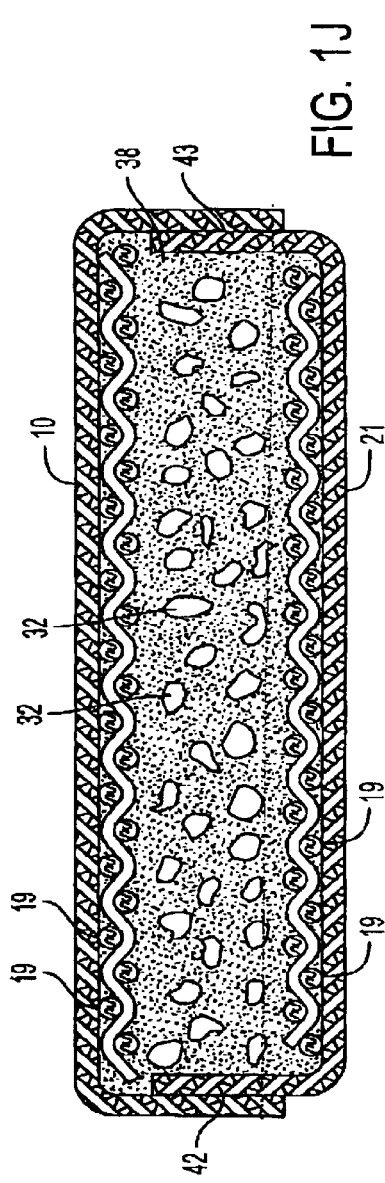
Figure 2:
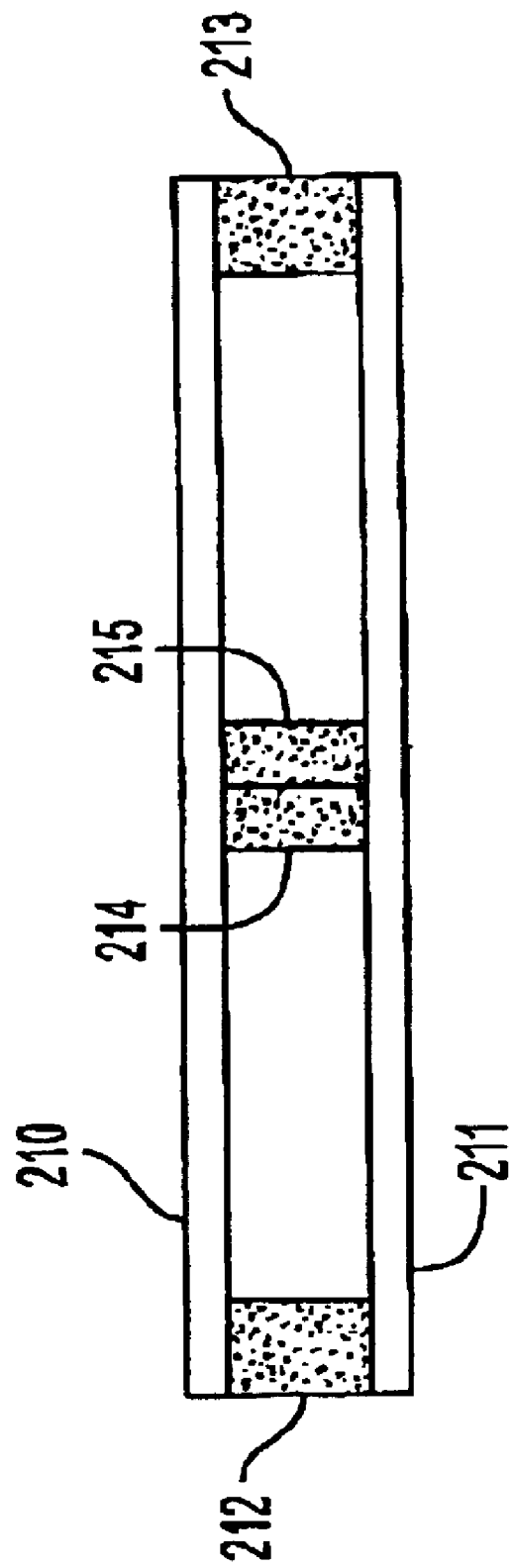

FIG. 2 is an elevation view of a shipping pallet constructed in accordance with the present invention. It is comprised of an upper deck 210 and a lower deck 211 that are both constructed of 1×4 s. The end stringers 212 and 213 are 3×4s, set on edge. The two center stringers 214 and 215 are both 2×4s, also set on edge. Now follows a description of how, for example, the deck boards and stringers may be formed of composite structural material of the present invention.

Each of the boards is made of two facing C channels, as illustrated in FIG. 1 herein. Both broad surfaces of each of the deck boards are underlaid with cloth, as shown in FIG. 11 herein, except that cross-laid scrim is used instead of a woven fabric. The scrim has a warp made of 1000 denier multifilament polyester cords and a woof made of 250 denier multifilament polyester cords. The warp density is 12 cords per lateral inch; the woof density is 6 cords per longitudinal inch. The warp side of the scrim is toward the outside in each board. In each of the stringers, the narrow surfaces are underlaid with the same scrim, also with the warp cords toward the outside of the board and running in the longitudinal direction. The outer ply of all the boards is 100% recycled standard linerboard paper having a basis weight of about 69 lbs., which has been rigidified with a two-component epoxy resin, such as Product Code R 88-14B/H 88-14E from Copps Industries, Inc. In all of the boards, the warp cords are pretensioned to about 80–85% of their capacity.

In the top deck boards 210, the core material is made of a mixture of 25.55 parts by weight (pbw) of a polyurethane foam system, 5.06 pbw of Huntsman Chemical 5371 EPS beads, and 69.39 pbw of No. 4 tire granule which has been magnetically separated, without removal of tire cord fluff. The polyurethane system consists of Baydur 645B isocyanate and Baydur 645A polyol. The EPS beads are substantially fully expanded prior to being mixed with the other ingredients. This core material has a specific gravity in the range of about 9.6 to 10.2 ft$^3$.

The bottom deck boards 211 all contain a core material made of the same ingredients as the core material of boards 210, but in this ratio: 21.26 pbw polyurethane foam system, 6.57 pbw EPS beads, and 72.17 pbw granulated rubber. The cores of the bottom deck boards 211 all have a specific gravity in the range of about 9.3 to 9.8 lbs/ft$^3$, about 0.2 to 0.4 lbs/ft$^3$ less than the specific gravity of the core material in the top deck boards 210. (Alternatively, although not shown, the bottom boards might have the same core material as the top boards, but be about 17 to 33% thinner than the top boards, since they do not have to carry as much of a load. As a third option, the top and bottom deck boards can, of course, be identical.)

The stringers 212–215 all contain a core material made of a mixture of 28.58 pbw of a polyurethane foam system and 71.42 pbw of a granulated rubber. The polyurethane foam system consists of Baydur 645B isocyanate and Baydur 649A polyol. The same granulated rubber is used as in the deck boards. Due to the increased concentration of granulated rubber and the absence of any EPS beads, the core material of the stringers 212–215 has a specific gravity in the range of about 47.7 to 48.3 lbs/ft$^3$.

All the deck boards (top and bottom) are held to the stringers 212–215 by Halstead gun nails No. HOR30120, which are framing nails having the following specifications:

round 0.281 inch head 3 inches in length ring shank made from 0.120 inch diameter drawn, low carbon, steel wire diamond point minimum tensile strength of 120,000 psi coated with thermoplastic resin (a dried latex adhesive)

Although specific embodiments of the present invention have been described above in detail, it will be understood that this description is merely for purposes of illustration. Various modifications of and equivalent structures corresponding to the disclosed aspects of the preferred embodiments described above may be made by those skilled in the art without departing from the spirit of the present invention, which is defined by the following claims.

What is claimed is:

1. An elongated, composite structural material comprised of a dimensionally stable core material ensheathed in a laminar covering that is bonded to the core material, wherein the laminar covering is comprised of at least one band of substantially parallel reinforcing cords bonded, by a resin, to at least one layer of a dimensionally stable web material that is exterior to the cords, the web material being selected from the group consisting of rigidified paper and rigidified cloth, with the web material and the cords being impregnated with the same resin that is used to bond the cords to the web material, the amount of the resin being sufficient to render the laminar covering dimensionally stable, and the cords being oriented in the longitudinal direction of the structural material and extending substantially the entire length thereof, wherein the cords are bonded to the web material by an unfoamed resin.

2. The composite structural material of claim 1, wherein at least some of the cords are bonded to the web material in a pretensioned state.

3. The composite structural material of claim 1, wherein the structural material has a substantially uniform cross-section throughout its length, and wherein the width of the band of cords occupies about 25 to 100 percent of the circumference of that cross-section.

4. The structural material of claim 1, wherein the cords are the warp of a strip of cloth that has been bonded to the web material under tension in the warp direction.

5. The composite structural material of claim 4, wherein the cloth strip is bonded to the web material by a thermo-setting resin.

6. The composite structural material of claim 1, wherein the web material is paper that is impregnated with a rigidi-fying synthetic resin.

7. The composite structural material of claim 6, wherein the paper comprises cellulosic fibers.

8. The composite structural material of claim 4, wherein the laminar covering comprises a plurality of cloth strips and interleaved between every two of said cloth strips is at least one paper layer.

9. The composite structural material of claims 1, wherein the core material is comprised of pieces of a filler solid embedded in a resinous matrix.

10. The composite structural material of claim 9, wherein the resinous matrix comprises a thermosetting resin.

11. The composite structural material of claim 10, wherein the core material has a crush resistance of at least about 300 pounds per square inch.

12. The composite structural material of claim 9, wherein the pieces of filler solid comprise pieces of one or more solids selected from the group consisting of lignocellulosic materials, cellulosic materials, vitreous materials, cementi-tious materials, carbonaceous materials, plastic, and rubbers.

13. The composite structural material of claim 9, wherein the pieces of filler solid comprise at least one member of the group consisting of rubber tire fragments and expandable polystyrene beads.

14. The composite structural material of claim 9, wherein the resinous matrix comprises a resin selected from the group consisting of epoxy resins and polyurethane resins.

15. The composite structural material of claim 4, wherein the laminar covering comprises at least one combination of a paper layer bonded to said cloth strip in which the warp is composed at least primarily of synthetic fibers or filaments.

16. The composite structural material of claim 4, wherein the laminar covering comprises at least one combination of a paper layer bonded to said cloth strip in which the warp is composed at least primarily of polyester fibers or filaments.

17. The composite structural material of claim 4, wherein the laminar covering comprises at least one combination of a paper layer bonded to said cloth strip in which the warp of the cloth is composed at least primarily of polyester fibers or filaments and the paper layer is composed at least primarily of cellulosic fibers.

18. The composite structural material of claim 9, wherein the resinous matrix comprises a foamed polyurethane resin.

19. The composite structural material of claim 6, wherein, in the laminar covering, the outermost layer is a paper layer.

20. An elongated composite structural material comprised of a dimensionally stable core material ensheathed in a laminar covering that is bonded to the core material, wherein the laminar covering is comprised of at least one band of substantially parallel reinforcing cords bonded, by a resin, to at least one layer of a dimensionally stable web material that is exterior to the cords, the web material being selected from the group consisting of rigidified paper and rigidified cloth, with the web material and the cords being impregnated with the same resin that is used to bond the cords to the web material, the amount of the resin being sufficient to render the laminar covering dimensionally stable, and the cords being oriented in the longitudinal direction of the structural material and extending substantially the entire length thereof, wherein the laminar covering comprises a plurality of paper layers and each paper layer is impregnated with a cured epoxy resin that helps bind the cords and the core material to the paper layers.

21. The composite structural material of claim 4, wherein the laminar covering comprises at least one combination of a kraft paper layer bonded to said cloth strip in which the cloth is composed at least primarily of continuous polyester filament, the warp cord is selected from the group consisting of monofilament cord having a diameter of about 0.010 to 0.15 inch and multifilament cord having a denier of about 600 to 1,000, and the cloth has warp direction tensile strength in the range of about 90 to 200 pounds per lateral inch of the cloth.

22. The composite structural material of claim 21, wherein the kraft paper in at least one combination has a thickness of about 0.015 to 0.020 inch.

23. The composite structural material of claim 22, wherein the core material has a crush resistance of about 300 to 2,500 pounds per square inch.

24. The composite structural material of claim 23, wherein the laminar covering comprises at least one said cloth strip that is bonded to the paper layer under a tension, in the warp direction, of at least about 10 pounds per each inch of width of the cloth.

25. The composite structural material of claim 1, wherein its cross-sectional shape is rectangular, so that the structural material has four sides, and wherein the laminar covering includes cords on at least one side of the structural material.

26. The composite structural material of claim 1, wherein its cross-sectional shape is a non-square rectangle, so that the structural material has two, opposite wide sides and two, opposite narrow sides, and wherein the laminar covering includes cords on each of said wide sides of the structural material.

27. The composite structural material of claim 26, wherein the laminar covering is comprised of two opposed, overlapping, conjoined, C channels, each C channel cover-ing one of the wide sides and running the entire length of the structural material.

28. The composite structural material of claim 5, wherein the cloth strip is woven.

29. The composite structural material of claim 5, wherein the cloth strip is cross-laid scrim.

30. An elongated four-sided, composite structural material having a substantially uniform, rectangular cross-section throughout its length, the material being comprised of a rigid polyurethane foam core material ensheathed in a laminar covering that is bonded to the core material by a thermosetting resin, wherein the laminar covering is comprised of at least one band of cloth, bonded, by a rigidifying thermosetting resin, to a layer of paper that is exterior to the cloth, the paper being impregnated with the same rigidifying thermosetting resin that is used to bond the cloth to the paper, the amount of the rigidfying thermosetting resin being sufficient to render the paper dimensionally stable, with the warp of the cloth being oriented in the longitudinal direction of the structural material and extending substantially the entire length thereof, and with said at least one band of cloth substantially covering at least two opposite sides of the structural material, wherein the core material has a crush resistance of at least about 300 psi, and wherein the at least one band of cloth is bonded to the paper layer by an unfoamed resin.

31. An elongated, four-sided composite structural material having a substantially uniform, rectangular cross section throughout its length, the material comprising:
a core comprised of pieces of a vitreous material embedded in a foamed polyether polyurethane resin, having a free-rise density of about 4 to about 20 pounds per cubic foot, the core having a crush resistance of at least about 300 pounds per square inch, the vitreous material constituting up to about 45 weight percent of the core and the vitreous pieces having a longest dimension that is no more than about 50 percent of the thickness of the composite structural material; and
a one-piece laminar covering that ensheaths the core and is bonded to the core, the laminar covering including a plurality of layers of substantially parallel fiberglass cords, each cord layer being bonded, by an unfoamed epoxy resin, to at least one of a plurality of layers of rigidified kraft paper having a basis weight of at least about 65 pounds per thousand square feet, wherein the cord layers and the paper layers are impregnated with the same unfoamed epoxy resin that is used to bond the cord layers to the paper layers, the amount of the unfoamed epoxy resin being sufficient to render the laminar covering dimensionally stable, and wherein the cords are laterally connected to one another, are oriented in the longitudinal direction of the structural material, and extend substantially the entire length thereof, each cord layer comprises at least 10 cords per lateral inch, and at least one paper layer is exterior of the cord layers.

32. The composite structural material of claim 9, wherein the filler solid comprises granular tire rubber including tire cord fluff.

33. The composite structural material of claim 32, wherein the granular tire rubber has a metal content of no more than about three weight percent of the rubber.

34. The composite structural material of claim 32, wherein the granular tire rubber has a metal content of no more than about one weight percent of the rubber.

35. The composite structural material of claim 34, wherein the tire rubber is comprised of No. 4 tire granule.

36. The composite structural material of claim 9, wherein the filler solid comprises No. 4 tire granule.

37. The structural material of claim 30, wherein the core material comprises pieces of at least one filler solid selected from the group consisting of tire rubber and expandable polystyrene beads and has a crush resistance in the range of about 300 to 1700 psi.

38. The structural material of claim 30, wherein the core material has a crush resistance the range of about 1800 to 2500 psi.

39. The composite structural material of claim 31, wherein granular tire rubber has a metal content of no more than about three weight percent of the rubber.

40. The composite structural material of claim 31, wherein the granular tire rubber has a metal content of no more than about one weight percent of the rubber.

41. The composite structural material of claim 40, wherein the tire rubber is comprised of No. 4 tire granule.

42. The composite structural material of claim 37, wherein the filler solid comprises No. 4 tire granule.

43. An elongated, composite structural material comprising:
a core comprised of pieces of a filler solid embedded in a resinous matrix; and
a laminar covering that ensheaths the core, the laminar covering being comprised of a layer of a plurality of substantially parallel reinforcing cords bonded, by an unfoamed resin, to a first layer of rigidified paper that is exterior to the cords, wherein the cords and the first paper layer are impregnated with the same unfoamed resin that is used to bond the cords to the first paper layer, the amount of the unfoamed resin being sufficient to render the laminar covering dimensionally stable, and wherein the cords are oriented in the longitudinal direction of the structural material and extend substantially the entire length thereof.

44. The structural material of claim 43, wherein the pieces of filler solid comprise granular pieces of one or more solids selected from the group consisting of lignocellulosic materials, cellulosic materials, vitreous materials, cementitious materials, carbonaceous materials, plastics, and rubbers.

45. The structural material of claim 43, wherein the pieces of filler solid comprise rubber tire fragments.

46. The composite structural material of claim 44, wherein the filler solid comprises granular tire rubber including tire cord fluff.

47. The composite structural material of claim 46, wherein the granular tire rubber has a metal content of no more than about three weight percent of the rubber.

48. The composite structural material of claim 46, wherein the granular tire rubber has a metal content of no more than about one weight percent of the rubber.

49. The composite structural material of claim 48, wherein the tire rubber is comprised of No. 4 tire granule.

50. The composite structural material of claim 44, wherein the filler solid comprises No. 4 tire granule.

51. The structural material of claim 43, wherein the pieces of filler solid comprise a vitreous material.

52. The structural material of claim 43, wherein the resinous matrix comprises a thermosetting resin.

53. The structural material of claim 43, wherein the resinous matrix comprises a foamed synthetic resin.

54. The structural material of claim 43, wherein the resinous matrix comprises a foamed polyurethane resin.

55. The structural material of claim 43, wherein the core has a crush resistance of at least about 300 pounds per square inch.

56. The structural material of claim 43, wherein the core has a crush resistance of about 300 to 2,500 pounds per square inch.

57. The structural material of claim 43, wherein the first paper layer comprises cellulosic fibers.

58. The structural material of claim 43, wherein the first paper layer comprises kraft paper.

59. The structural material of claim 43, wherein the cords comprise synthetic fibers or filaments.

60. The structural material of claim 43, wherein the cords comprise glass fibers or filaments.

61. The structural material of claim 43, wherein the cords comprise polyester fibers or filaments.

62. The structural material of claim 43, wherein the unfoamed resin that is used to bond the cords to the first paper layer is a thermosetting resin.

63. The structural material of claim 43, wherein the unfoamed resin that is used to bond the cords to the first paper layer is an epoxy resin.

64. The structural material of claim 43, wherein the cords are the warp of a strip of scrim, and the scrim is bonded to the first paper layer by the unfoamed resin.

65. The structural material of claim 43, wherein the cords are the warp of a strip of scrim, and the scrim is bonded to the first paper layer by an epoxy resin.

66. The structural material of claim 43, wherein, in the layer of cords, there are at least about 10 cords per lateral inch of the laminar covering.

67. The structural material of claim 43, wherein, in the layer of cords, there are about 10 to about 35 cords per lateral inch of the laminar covering.

68. The structural material of claim 43, wherein the cords are nonwoven.

69. The structural material of claim 43, wherein the cords are laterally connected to each other.

70. The structural material of claim 69, wherein the cords are laterally connected to each other by cross-cording.

71. The structural material of claim 43, wherein the laminar covering further comprises a second layer of rigidified paper that is interior to the first paper layer and the layer of cords.

72. The structural material of claim 71, wherein the cords are bonded to each of the first paper layer and the second paper layer by the unfoamed resin.

73. The structural material of claim 72, wherein each of the first paper layer and the second paper layer is impregnated with the unfoamed resin.

74. The structural material of claim 71, wherein the cords are bonded to each of the first paper layer and the second paper layer by an epoxy resin.

75. The structural material of claim 74, wherein each of the first paper layer and the second paper layer is at least partially impregnated with the epoxy resin.

76. The structural material of claim 43, wherein the laminar covering comprises a plurality of layers of paper and a plurality of layers of cords, with each cord layer being bonded to at least one paper layer.

77. The structural material of claim 76, wherein, in the laminar covering, the outermost layer is a paper layer.

78. The structural material of claim 43, wherein the laminar covering has a one-piece construction.

79. An elongated, four-sided composite structural material having a substantially uniform, rectangular cross section throughout its length, the material comprising:
a core comprised of granular pieces of a filler solid embedded in a foamed polyurethane resin, the filler solid comprising at least one solid selected from the group consisting of lignocellulosic materials, cellulosic materials, vitreous materials, cementitious materials, carbonaceous materials, plastics, and rubbers; and
a laminar covering that ensheaths the core and is bonded to the core, the laminar covering including a layer of a plurality of substantially parallel cords bonded, by an epoxy resin, to a layer of rigidified paper that is exterior to the cords, wherein the cords and the paper layer are impregnated with the same epoxy resin that is used to bond the cords to the paper layer, the amount of the epoxy resin being sufficient to render the laminar covering dimensionally stable, and wherein the cords comprise a synthetic fiber or filament and are oriented in the longitudinal direction of the structural material and extend substantially the entire length thereof.

80. The structural material of claim 79, wherein the laminar covering comprises a plurality of layers of paper and a plurality of layers of cords, with each cord layer being bonded to at least one paper layer.

81. The structural material of claim 80, wherein, in the laminar covering, the outermost layer is a paper layer.

82. The structural material of claim 79, wherein the filler solid comprises rubber tire fragments.

83. The composite structural material of claim 79, wherein the filler solid comprises granular tire rubber including tire cord fluff.

84. The composite structural material of claim 83, wherein the granular tire rubber has a metal content of no more than about three weight percent of the rubber.

85. The composite structural material of claim 83, wherein the granular tire rubber has a metal content of no more than about one weight percent of the rubber.

86. The composite structural material of claim 85, wherein the tire rubber is comprised of No. 4 tire granule.

87. The composite structural material of claim 79, wherein the filler solid comprises No. 4 tire granule.

88. The structural material of claim 79, wherein tire filler solid comprises a vitreous material.

89. The structural material of claim 79, wherein the cords comprise glass fibers or filaments.

90. The structural material of claim 79, wherein the cords comprise polyester fibers or filaments.

91. A shipping pallet comprised of deck boards and stringers made of the composite structural material recited in claim 1.

92. A shipping pallet comprised of deck boards and stringers made of the structural material cited in claim 30.

93. A shipping pallet comprised of deck boards and stringers made of the structural material cited in claim 43.

94. A shipping pallet comprised of deck boards and stringers, wherein at least one of the stringers or deck boards is made of the structural material recited in claim 45.

95. A shipping pallet comprised of deck boards and stringers made of the structural material recited in claim 79.

96. A shipping pallet comprised of deck boards and stringers, wherein at least one of the stringers or deck boards is made of the structural material recited in claim 82.

97. An elongated, four-sided composite structural material having a substantially uniform, rectangular cross section throughout its length, the material comprising:
a core comprised of rubber-tire fragments embedded in a foamed polyether polyurethane resin, having a free-rise density of about 4 to about 35 pounds per cubic foot, the core having a crush resistance of at least about 1100 pounds per square inch, the rubber-tire fragments constituting up to about 70 weight percent of the core and having a longest dimension that is no more than about 50 percent of the thickness of the composite structural material; and
a one-piece laminar covering that ensheaths the core and is bonded to the core, the laminar covering including a plurality of layers of substantially parallel fiberglass cords, each cord layer being bonded, by an unfoamed epoxy resin, to at least one of a plurality of layers of rigidified kraft paper having a basis weight of at least about 65 pounds per thousand square feet, wherein the cord layers and the paper layers are impregnated with the same unfoamed epoxy resin that is used to bond the cord layers to the paper layers, the amount of the unfoamed epoxy resin being sufficient to render the laminar covering dimensionally stable, and wherein the cords are laterally connected to one another, are oriented in the longitudinal direction of the structural material, and extend substantially the entire length thereof, each cord layer comprises at least 10 cords per lateral inch, and at least one paper layer is exterior to the cord layers.

98. The composite structural material of claim 37, wherein the filler solid comprises granular tire rubber including tire cord fluff.

* * * * *